United States Patent
Gibble et al.

(10) Patent No.: US 7,107,417 B2
(45) Date of Patent: Sep. 12, 2006

(54) SYSTEM, METHOD AND APPARATUS FOR LOGICAL VOLUME DUPLEXING IN A VIRTUAL TAPE SYSTEM

(75) Inventors: Kevin Lee Gibble, Tucson, AZ (US); Gregory Tad Kishi, Oro Valley, AZ (US); Jonathan Wayne Peake, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 286 days.

(21) Appl. No.: 10/231,345

(22) Filed: Aug. 29, 2002

(65) Prior Publication Data

US 2004/0044830 A1   Mar. 4, 2004

(51) Int. Cl.
*G06F 12/00* (2006.01)

(52) U.S. Cl. .......................................... 711/161; 714/6
(58) Field of Classification Search ................... 707/10, 707/102, 202, 204; 711/4, 111, 118, 153, 711/161; 714/6
See application file for complete search history.

(56) References Cited

U.S. PATENT DOCUMENTS

| | | | |
|---|---|---|---|
| 4,755,928 A | 7/1988 | Johnson et al. | |
| 5,875,478 A | 2/1999 | Blumenau | 711/162 |
| 5,926,836 A | 7/1999 | Blumenau | 711/162 |
| 5,940,849 A | 8/1999 | Koyama | 711/4 |
| 6,009,481 A * | 12/1999 | Mayer | 710/33 |
| 6,023,709 A | 2/2000 | Anglin et al. | 707/204 |
| 6,029,179 A | 2/2000 | Kishi | 707/202 |
| 6,105,037 A | 8/2000 | Kishi | 707/201 |
| 6,173,359 B1 | 1/2001 | Carlson et al. | 711/111 |
| 6,226,759 B1 | 5/2001 | Miller et al. | 714/6 |
| 6,269,423 B1 | 7/2001 | Kishi | 711/113 |
| 6,317,814 B1 | 11/2001 | Blendermann et al. | 711/162 |
| 6,336,163 B1 | 1/2002 | Brewer et al. | 711/112 |
| 6,467,024 B1 * | 10/2002 | Bish et al. | 711/114 |
| 6,502,205 B1 * | 12/2002 | Yanai et al. | 714/7 |
| 6,718,427 B1 * | 4/2004 | Carlson et al. | 711/5 |
| 2002/0178335 A1 * | 11/2002 | Selkirk et al. | 711/162 |
| 2003/0005248 A1 * | 1/2003 | Selkirk et al. | 711/165 |

* cited by examiner

*Primary Examiner*—Christian P. Chace
(74) *Attorney, Agent, or Firm*—Kunzler & Associates

(57) ABSTRACT

A system, method, and apparatus are provided for copying a virtual volume to multiple physical volumes within a virtual tape system. The virtual tape system may include a virtual tape server (VTS), a library manager, and a plurality of tape drive units into which cartridges may be individually mounted. The virtual tape system stores virtual volumes, each of which represents a physical volume, although one or more virtual volumes are actually stored on a real physical volume. The library manager contains a volume database with a plurality of constructs and associated storage management actions. The constructs are received from a host computer connected to the VTS, but the storage management actions may be entered directly into the library manager, independently of the host. The library manager reads the management action associated with one or more constructs of a virtual volume and, along with the VTS, determines whether multiple physical copies of the virtual volume are to be made.

28 Claims, 7 Drawing Sheets

SYSTEM, METHOD AND APPARATUS FOR LOGICAL VOLUME DUPLEXING IN A VIRTUAL TAPE SYSTEM

BACKGROUND OF THE INVENTION

1. The Field of the Invention

The invention relates to virtual tape systems and more particularly to the creation of multiple physical volumes in a manner that is transparent to the host of the virtual tape system.

2. The Relevant Art

High density, removable media storage libraries are used to provide large quantities of storage in computer systems. Typically, such data storage systems are employed for backup or other types of secondary storage purposes, but may be used as primary storage in circumstances that are conducive to sequential data access and the like.

The data is stored on media cartridges, such as magnetic or optical disks, that are arranged in storage bins and accessed when data on a cartridge is requested. Currently available media cartridges are capable of storing much more data than early media cartridges. For example, a data volume that corresponds to a 400 Megabyte disk may now be stored on a disk with up to 60 Gigabytes of storage capacity. Unfortunately, much legacy equipment in existing computer systems is configured for the smaller data volume sizes.

Volume mapping is used to create a correlation between the physical capacity of a storage cartridge (stack volume or physical volume) and the data storage unit size (virtual volumes or logical volumes) of a file or block that is stored on the cartridge. Given the available data storage capacity of a disk, such mapping allows multiple logical volumes to be stored on a single physical volume, hence providing an efficient use of the available storage media. A virtual tape server (VTS) is one device capable of creating and maintaining such mapping among physical volumes and logical volumes.

In certain circumstances, it may be desirable to make two physical back-up copies of a single logical volume. For example, if the data is particularly important, it may be wise to store it in multiple locations to avoid loss due to failure of a single tape or tape drive unit. Systems and methods have been proposed to create two physical copies of a logical volume in a virtual tape system. Unfortunately, a number of deficiencies exist in such known systems and methods.

For example, many known dual copy systems require an explicit command from the host to initiate creation of a second copy. The software running on the host must be modified to provide the dual copy command. As a result, such a dual copy system may be difficult to use with existing (legacy) software. Consequently, adding dual copy capability to an existing system may be rather difficult. Such dual copy systems may also require that the host transmit the data to the VTS again to create the second copy. Thus, the I/O resources of the host are unduly taxed.

Furthermore, some dual copy systems require the host to track the locations, i.e., the physical storage sites, of the logical volumes. This may require the maintenance of a database on the host to store metadata for each file stored in the VTS. Again, such dual copy systems are difficult or impossible to incorporate into existing host systems without providing new host software, and may unduly tax the resources of the host. Additionally, such a system may be difficult to use in a heterogeneous environment, i.e., with host computers that use different operating systems, file formats, etc.

Additionally, many known dual copy systems are somewhat inefficient in their use of VTS resources. In some instances, the primary copy is made from the virtual volume, and then the secondary copy is made from the primary copy. This requires extra time due to the need to mount and read from the tape on which the primary copy is stored. Additionally, VTS memory is required to transport the data from the primary location to the secondary location.

Thus, it would be an advancement in the art to provide a virtual tape system capable of making multiple copies of a logical volume in a manner that is substantially transparent to the host and thus does not burden the host's resources. It would be a further advancement in the art to provide a virtual tape system capable of efficiently storing and accessing file location information independent of the host. Yet further, it would be an advancement in the art to provide a virtual tape system that minimizes the VTS resources required to make the additional physical copies.

OBJECTS AND BRIEF SUMMARY OF THE INVENTION

The present invention has been developed in response to the present state of the art, and in particular, in response to the problems and needs in the art that have not yet been fully solved by currently available virtual tape systems and methods. Accordingly, it is an overall object of the present invention to provide a dual-copy capable virtual tape system that overcomes many or all of the above-discussed shortcomings in the art. To achieve the foregoing object, and in accordance with the invention as embodied and broadly described herein in the preferred embodiments, a system, method, and apparatus for logical volume duplexing in a virtual tape system are provided.

According to one embodiment, the virtual tape system includes a virtual tape server (VTS) in communication with a plurality of tape drive units and a library manager. The VTS receives the logical, or virtual, volumes and stores them for subsequent transmittal to the host or the tape drive units. The library manager controls the physical loading of media cartridges, i.e., physical volumes, into the tape drive units by controlling a robotic accessor arm that retrieves the physical volumes and loads them into the tape drive units in response to a request from the host or VTS.

The VTS is provided with a plurality of virtual tape volumes, which may exist on a hard drive system or other suitable storage medium. Additionally, the VTS preferably contains a file system manager that interacts with a DASD cache to store information. More specifically, a hierarchical storage manager of the VTS uses a hierarchical storage manager database stored in the DASD cache to determine where corresponding virtual tape volumes are located on each physical volume. An automated storage manager administrator communicates with the library manager.

Each virtual tape volume has one or more constructs associated with it. The constructs are received from the host. The library manager has a construct manager designed to receive user input to associate volume management actions with constructs. The volume management actions specify where virtual volumes should be physically stored, including secondary locations if dual copying of the volume is to be performed.

The constructs and associated volume management actions are stored in a database within a DASD cache of the library manager. The library manager also has a construct manager designed to access the database to receive the applicable volume management actions for a virtual tape volume, based on its assigned constructs from the database. Instructions are transmitted to the VTS to initiate creation of two physical copies of the virtual volume, as well as for other management actions.

The virtual tape volumes of the VTS are represented by files, each of which represents a virtual volume. The file name is the volume serial number (VOLSER) used to identify the volume to the host and the VTS. Each file contains host data and an object identifier which also represents the volume. The VTS stores a limited number of complete volumes in its DASD cache. The remaining files in the DASD cache are stubs, each of which has at least the object identifier, and possibly a small portion of the data for a given virtual tape volume. The stub is used to access the volume if the complete volume is not resident in the DASD cache.

More precisely, the object identifiers for each virtual tape volume are also stored in the hierarchical storage manager database. The hierarchical storage manager database preferably has physical locations mapped to each of the object identities so that the physical volume on which any given virtual tape volume resides can be readily found.

The database located within the library manager in one embodiment contains volume serial numbers used to identify physical or virtual volumes. Additionally, the library manager has one or more constructs received from the host for each of the VOLSERs. The constructs may, for example, include a data class, a storage class, a management class, and a storage group. Constructs can be a character string representing a user understood name or other suitable combination of characters and numbers that have meaning to a user setting up data management characteristics for the VTS. Volume management actions are also associated with the constructs, for example, where the virtual tape volume should be physically stored. A volume management action may also specify a second physical location if the volume is to be redundantly stored on two physical volumes.

According to one possible data flow of the invention, the host transmits commands to the VTS. The commands include instructions to mount a virtual tape volume along with one or more constructs and the data to be stored. The VTS receives the commands and stores the data in the form of a file in the DASD cache, indicated by the VOLSER in one of the commands. A redacted command is sent further to the library manager; the redacted command contains the VOLSER and the management constructs.

The library manager stores the management constructs for the VOLSER, and when requested by the VTS, the library manager transmits the volume management actions associated with the constructs assigned to the VOLSER to the VTS.

According to one storage method, after the VTS receives the volume management actions for the virtual tape volume from the library manager, the virtual volume is first copied to a physical volume in the secondary storage pool from the corresponding file in the DASD cache. A secondary stub is then created in the DASD cache, including an object identifier corresponding to the secondary location of the volume. The volume is then copied from the same corresponding file to a physical volume in the primary storage pool, and an object identifier corresponding to the primary location of the volume is added to the file header in the DASD cache. The file that represents a virtual volume's data in the DASD cache is reduced to a stub when a cache management algorithm determines that the space in the DASD cache would be better used to hold a different virtual volume.

According to one retrieval method, a data request is received by the VTS from the host. If the virtual tape volume that contains the data is completely resident in the DASD cache, the data is provided to the host. If only the stub remains in the DASD cache, the VTS first determines the location of the needed data on a physical volume in the primary pool via the object identifier from the stub. The requested data is retrieved from the physical volume in the primary pool, and used to create a virtual tape volume for the requested data in the DASD cache. If the data on the physical volume in the primary pool is not accessible, the VTS determines the location of the needed data on a physical volume in the secondary pool via the object identifier from the secondary stub. The requested data is retrieved from the physical volume in the secondary pool, if possible, to create the virtual volume. If retrieval from the secondary pool is not possible, the request fails.

Through the use of the virtual tape system of the present invention, dual copies may be made in a manner that does not require the direct involvement of the host. The host need not track which volumes are to be redundantly stored, preserving the resources of the host. Additionally, the VTS maintains the locations of the physical volumes in a simple, efficient format.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
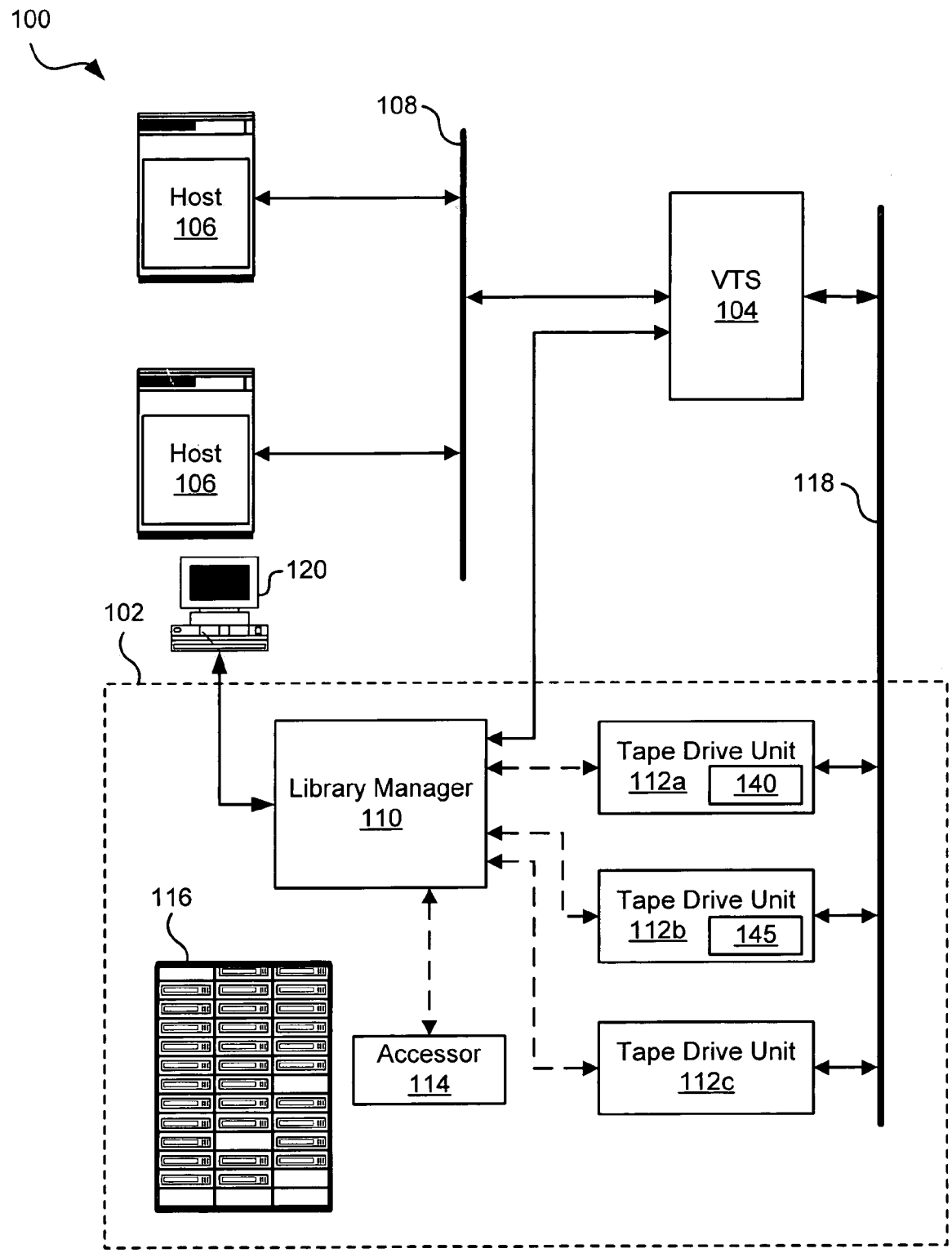
FIG. 1 is a schematic block diagram illustrating one embodiment of a virtual tape system according to the invention.

FIG. 1 illustrates a schematic block diagram of one embodiment of a representative virtual tape system 100, in accordance with the present invention. The system 100 includes an automated library unit 102, at least one VTS 104, and at least one host 106. Each host 106 may be a mainframe computer. Alternatively, the hosts 106 may be servers or personal computers using a variety of operating systems. The host 106 and the VTS 104 are connected via a storage area network (SAN) 108 or another suitable communications channel, for example, an Enterprise System Connection (ESCON) channel used in IBM mainframe computers.

The automated tape library unit 102 includes a library manager 110, one or more data drive devices, which may be tape drive units 112, an accessor 114, and a plurality of media cartridges 116. The library manager 110, which includes at least one computing processor, is interconnected with and controls the actions of the tape drive units 112 and the accessor 114. The configuration of the library manager 110 will be shown and described in greater detail below.

In FIG. 1, three tape drive units 112a, 112b, and 112c are shown. The present invention is operable with one or more tape drive units 112. The tape drive units 112 may share one single repository of cartridges 116. Alternatively, the tape drive units 112 may utilize multiple repositories of cartridges 116. The tape drive units 112 may advantageously be distributed over multiple locations to decrease the probability that multiple tape drive units 112 will be incapacitated by a disaster in one location. In one embodimnet, a primary physical copy 140 may be stored on the first tape drive unit 12a within a primary storage pool. Similarly, a secondary physical copy 145 may be stored on the second tape drive 112b within a secondary storage pool.

The interconnections between the library manager 110, the tape drive units 112, and the accessor 114 are shown as dashed lines to indicate that the library manager 110 transmits and receives control signals, rather than data to be stored or retrieved, to the tape drive units 112 and/or the accessor 114. Data for storage or retrieval may instead be transmitted directly between the VTS 104 and the tape drive units 112 via a network 118, which may be a storage area network, (SAN), local area network (LAN), wide area network (WAN), or another suitable type of network, including the Internet or a direct connection between the VTS 104 and the tape drive units 112 via a point to point or multi-drop buss connection, for ex ample, a Small Computer Storage Interface (SCSI) interface. Alternatively, control signals for tape drives 112 can be transmitted and received though connections between the VTS 104 and the library manager 110 and the VTS 104 and the tape drives 112 via network 118.

The accessor 114 may be a robotic arm or another mechanical device configured to transport a selected cartridge 116 between a storage bin and a tape drive unit 112. The accessor 114 typically includes a cartridge gripper and a bar code scanner, or a similar read system, mounted on the gripper. The bar code scanner is used to read a volume serial number (VOLSER) printed on a cartridge label affixed to the cartridge 112. In alternative embodiments, the tape drive units 112 may be replaced by optical disk drives or other magnetic drives. Similarly, the cartridges 116 may contain magnetic media, optical media, or any other removable media corresponding to the type of drive employed.

A control console 120 is connected to the library manager 110. The control console 120 may be a computer in communication with the library manager 110 so that a user can control the operating parameters of the tape library unit 102 independently of the host 106.

Figure 2:
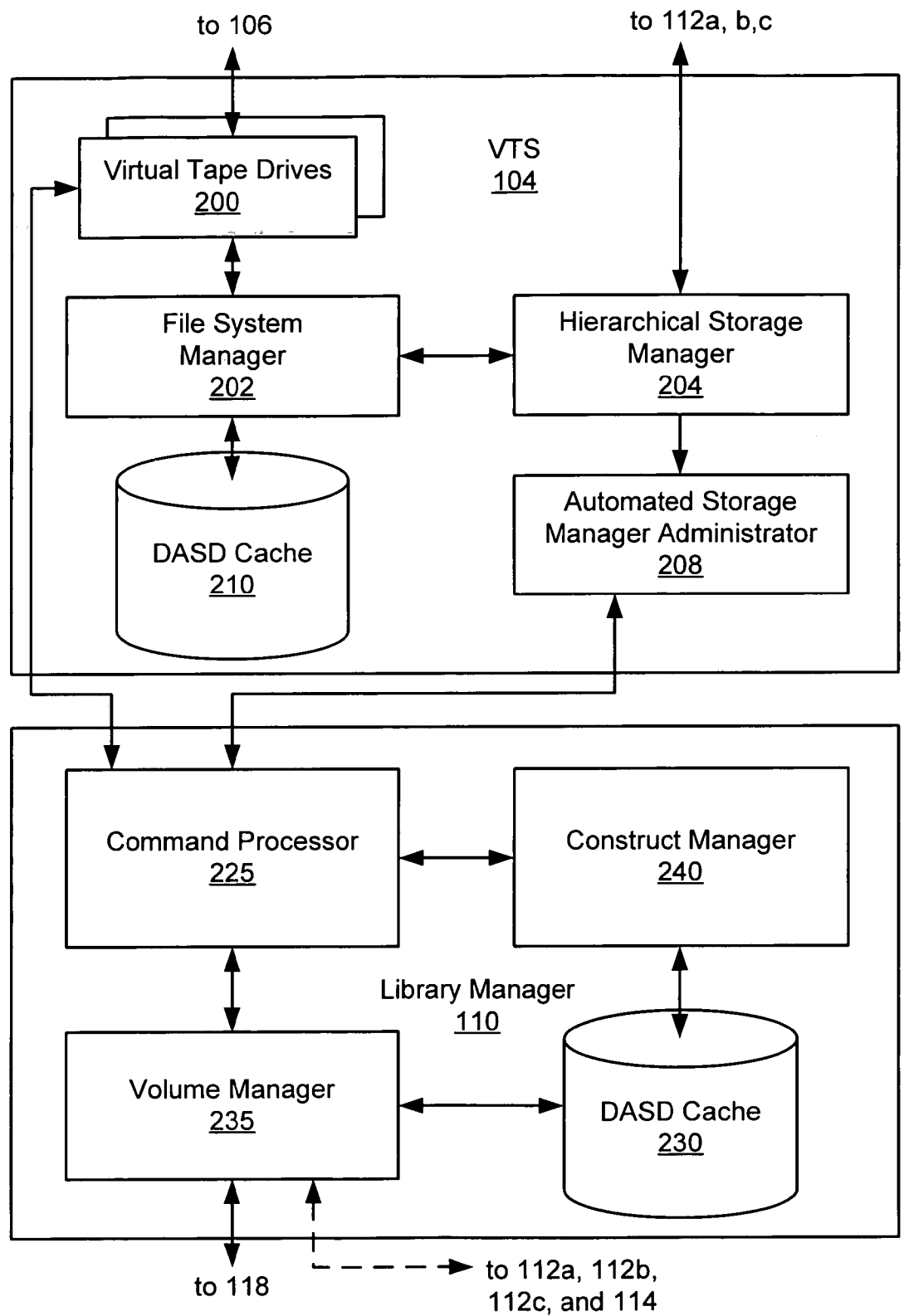
FIG. 2 is a schematic block diagram illustrating one embodiment of a virtual tape server (VTS) and one embodiment of a library manager suitable for use with the virtual tape system of FIG. 1.

FIG. 2 illustrates a schematic block diagram depicting one embodiment of the VTS 104 and one embodiment of the library manager 110 of FIG. 1. The VTS 104 and the library manager 110 may each take the form of a computer with a bus, processor, memory, and the like. These elements have been omitted from FIG. 2 to more clearly depict the various executable modules and data blocks of the VTS 104 and the library manager 110 pertinent to the invention. There could also be other executable modules and data blocks known in the art in implementing a VTS or library manager, but are omitted to focus on the elements essential to the invention.

As shown, the VTS 104 includes a plurality of virtual tape drives 200, a file system manager 202, a hierarchical storage manager client 204, an automated storage manager administrator 208, and at least one direct access storage device (DASD) cache 210. The DASD cache 210 temporarily stores data from the host 106 on virtual volumes in the form of files, and may thus be referred to as a "cache." A write command from the host 106 is processed by the VTS 104, through a virtual tape drive 200 into the DASD cache 210, prior to transferring the updated logical volume from the DASD cache 210 to the physical volume 116. According to one example, the DASD cache takes the form of one or more hard disk drives, which may be arranged in a redundant array of independent drives (RAID configuration), such as RAID 5. The virtual tape drives 200 also process control commands from host 106.

The DASD cache 210 contains other data. The file system manager 202 manages and coordinates data storage in the DASD cache 210. The hierarchical storage manager 204 controls the interface communications between the file system manager 202 and the tape drive units 112. The automated storage manager administrator 208 controls communications between the VTS 104 and the library manager 110.

The library manager 110 manages the virtual and physical volumes as well as the constructs. More specifically, the library manager 110 includes the command processor 225 that receives control commands from the virtual tape drives 200 and the automated storage manager administrator 208. The command processor 225 passes instructions about the management of the virtual and physical volumes to the volume manager 235. The volume manager 235 stores information about the virtual and physical volumes on a DASD cache 230 of the library manager 110. In addition, depending on the instructions it receives, it sends instructions to the tape drive units 112 and/or the accessor 114 to load or "mount" the cartridges 116 on which copies of the virtual volume are to be made or retrieved. Mounting of multiple cartridges 116 may be generally simultaneous or in a certain order, depending on the configuration of the accessor 114 and the tape drive units 112.

The library manager 110 also has a construct manager 240 that receives user instructions from the control console 120 regarding the volume management actions to be followed for a given construct name. The volume management actions are stored and retrieved by the construct manager 240 on a DASD cache 230 of the library manager 110. For certain control commands received by the command processor 225 from the automated storage manager administrator 208, the command processor 225 instructs the construct manager 240 to provide the volume management actions for a specific virtual volume. The command processor 225 then passes the returned volume management actions for a specific virtual volume to the automated storage manager administrator 208.

Figure 4:
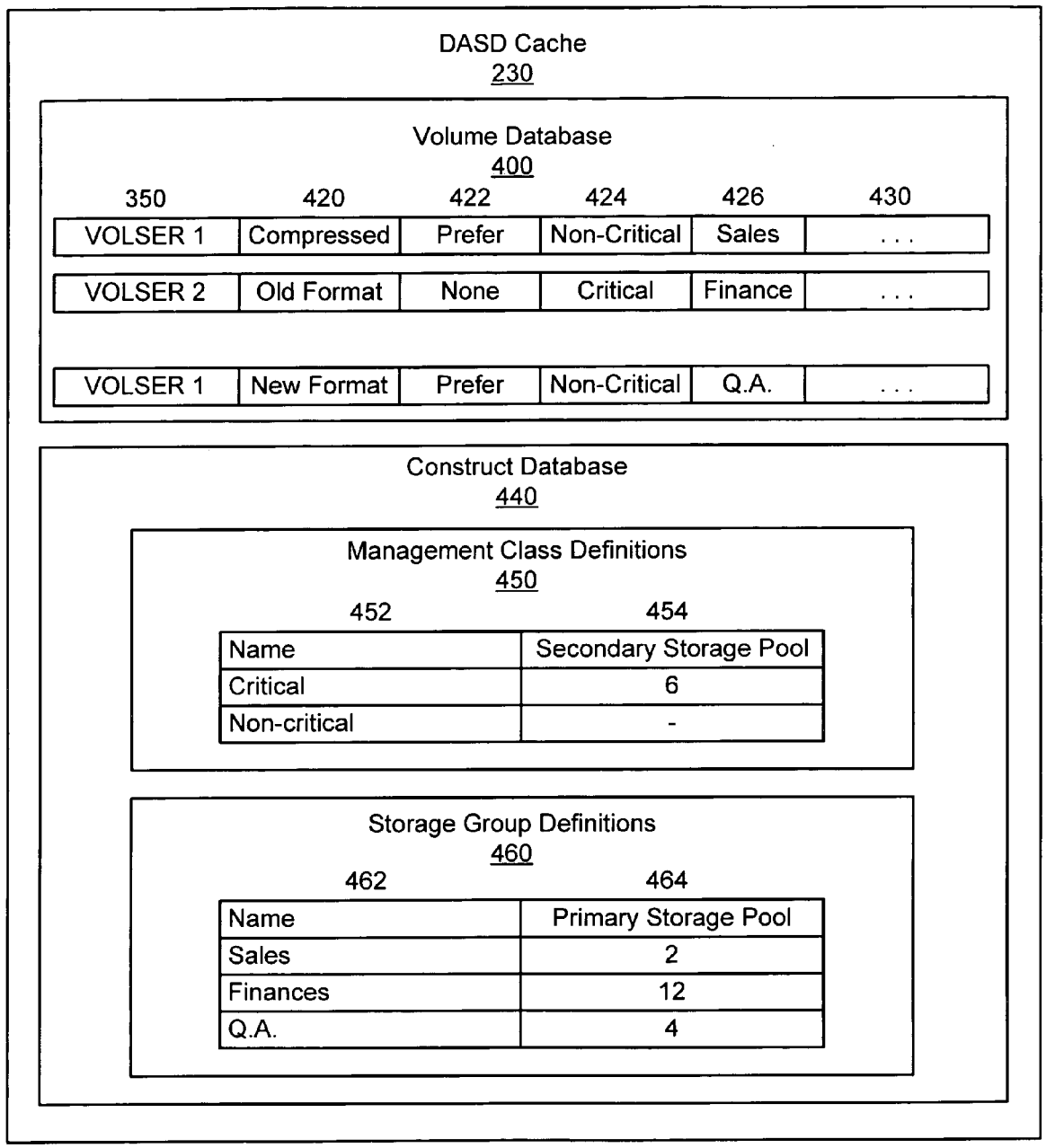
FIG. 4 is a schematic block diagram illustrating one embodiment of a DASD cache of the library manager of FIG. 1, containing a volume and a construct database in accordance with the present invention.
Figure 5:
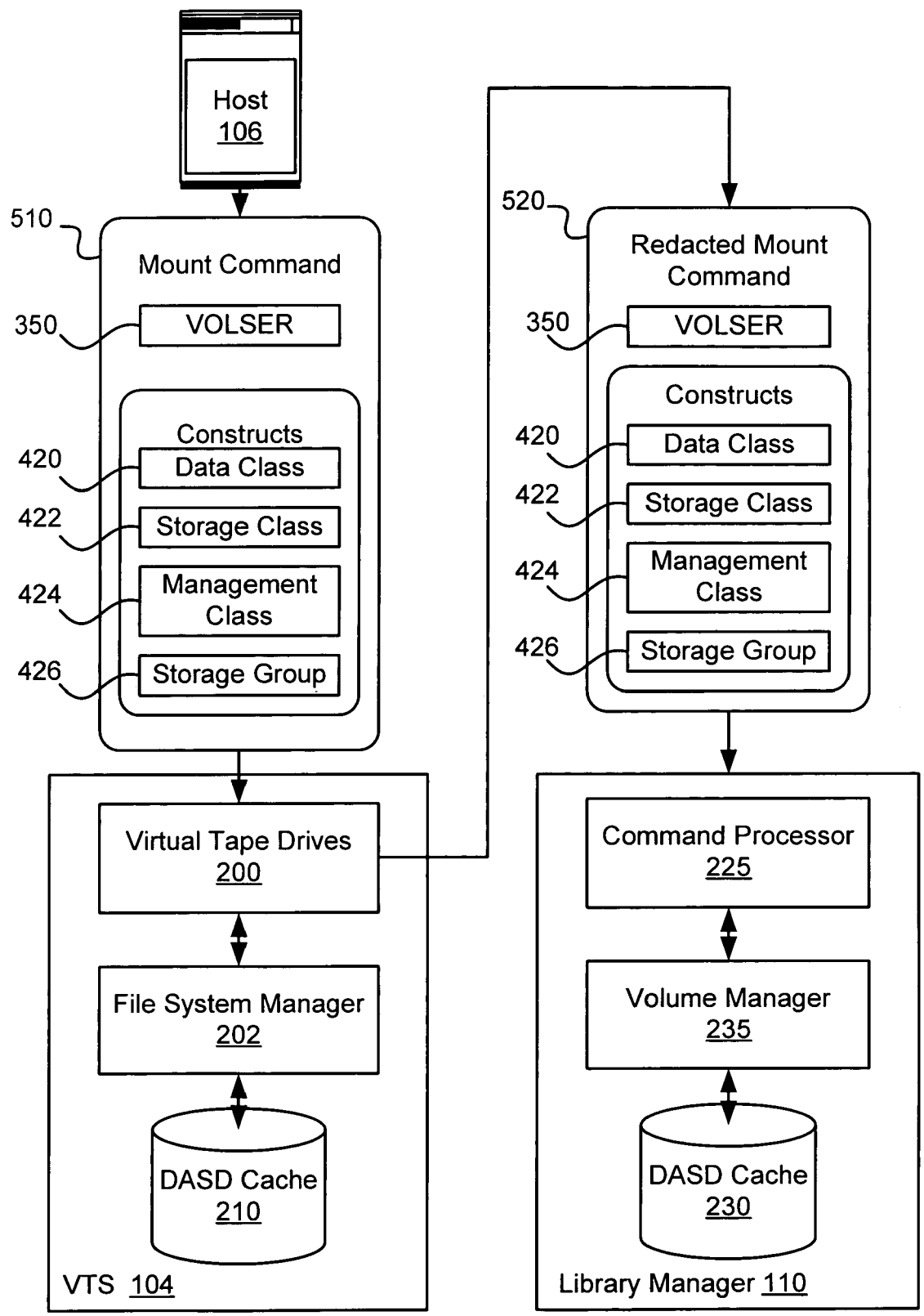
FIG. 5 is a schematic block diagram illustrating a data flow according to one embodiment of a manner in which constructs are associated with virtual volumes in the virtual tape system of FIG. 1.

The contents of the DASD cache 210 of the VTS 104 will be shown and described in greater detail in connection with FIG. 3. FIGS. 4 and 5 will provide additional detail regarding the storage of the volume management actions within the DASD cache 230 of the library manager 110 and the manner in which constructs and their associated volume management actions are retained, respectively.

Figure 3:
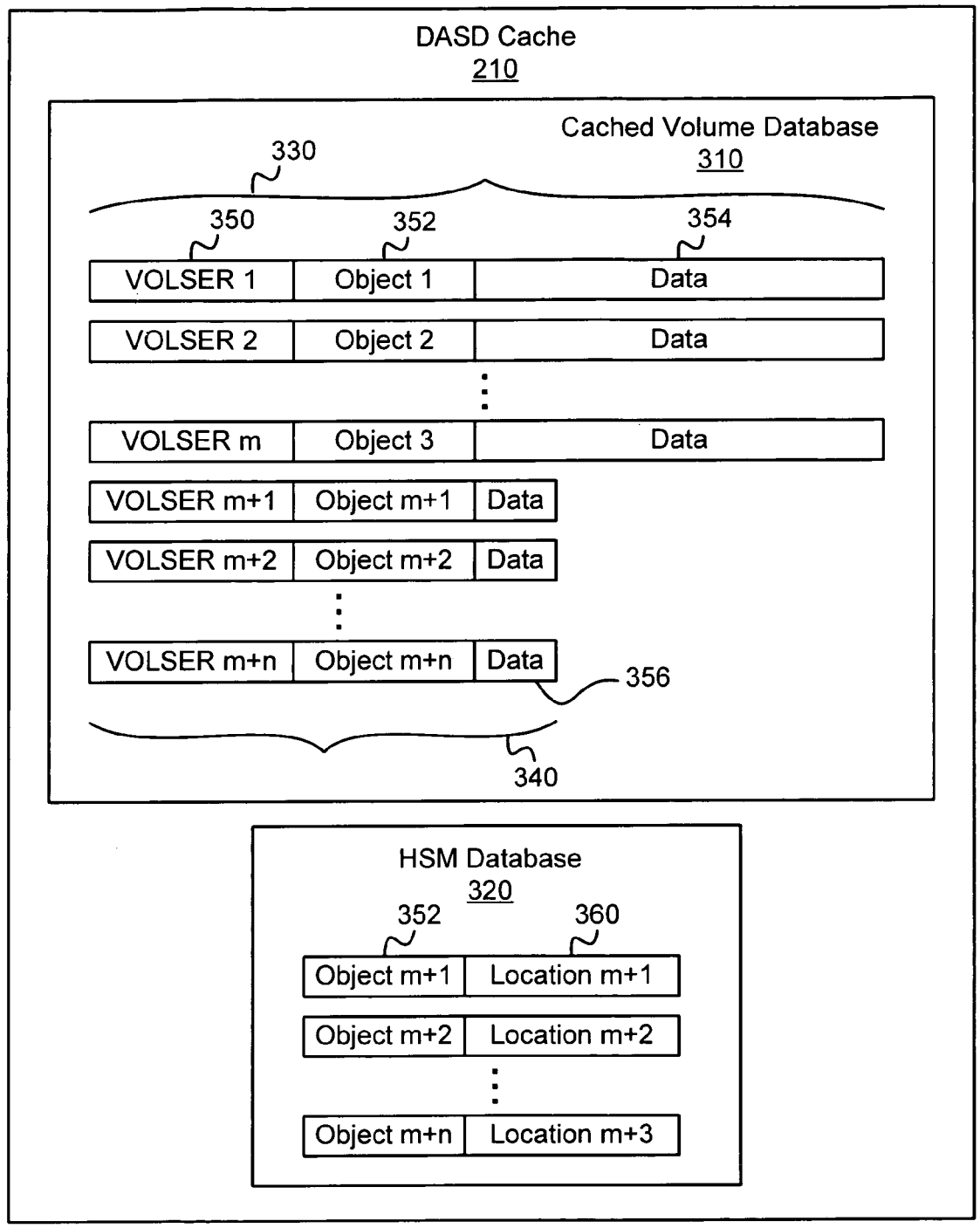
FIG. 3 is a schematic block diagram illustrating one embodiment of a DASD cache and data structures that may be contained within the DASD cache of the VTS of FIG. 1.

Referring to FIG. 3, the contents of the DASD cache 210 is depicted. The DASD cache 210 contains a cached volume database 310 in which virtual volumes are stored in the form of files. The DASD cache 210 also contains a hierarchical storage manager (HSM) database 320 that tracks the location of specific files on the cartridges 116.

More specifically, the cached volume database 310 has a plurality of files 330, each of which contains an entire volume of data received from the host 106 or the tape drive units 112. Additionally, the cached volume database 310 contains a plurality of stubs 340. Each of the files 330 and stubs 340 has a header containing at least an object identifier 352. The VOLSER 350 is used to identify to the virtual volume and in one embodiment, is the name of the file. The VOLSER 350 may or may not be the same as the VOLSER of the cartridge 116. For example, if each cartridge 116 contains only a single virtual volume, the VOLSER 350 of the virtual volume may be the same as that of the cartridge 116 that stores the corresponding data. However, different VOLSERs may be necessary if each cartridge 116 contains data corresponding to multiple virtual volumes.

The object identifier 352 is used to find the physical location of a virtual volume in the HSM database 320. Each file 330 also contains data 354, which is the actual data to be stored to or be retrieved from the cartridges 116. The stubs 340 are in one embodiment files that have been truncated. More precisely, each of the stubs 340 may include only, the object identifier 352, and optionally, a small portion 356 of the data 354. The stubs 340 are preferably each limited to a standard size, such as 4,096 bytes. Since the capacity of the DASD cache 210 is limited, only a limited number of files 330 can be virtually stored at any point in time in the DASD cache 210. The remaining files are truncated to form the stubs 340, which can be accessed, and used in conjunction with the HSM database 320 to obtain the physical location of the respective files 330. The full files 330 are off-loaded to cartridges in the automated tape library unit 102 prior to being truncated to a stub.

The determination of which files 330 are to be truncated to form stubs 340 is made by a cache management algorithm (not shown) that determines the likelihood that a given file will soon be needed by the host 106. Files 330 are truncated if they are less likely to be read or written to in the near future.

The HSM database 320 contains the object identifiers 352, which are preferably the same as those of the files 330 and the stubs 340 of the DASD cache 210. Each of the object identities 352 is associated with a location 360, which refers to the location of the data on a physical volume (i.e., one of the cartridges 116) that corresponds to the virtual volume having the object identity 352.

Thus, if a desired volume is stored only as a stub 340 in the DASD cache 210, the VTS 104, and more specifically, the hierarchical storage manager 204, may use the object identity 352 for the desired volume to locate the corresponding physical volume. The physical volume can then be loaded into the tape drive units 112a, 112b, or 112c via control signals from the library manager 110 and read into the DASD cache 210, through hierarchical storage manager 204, to retrieve the data 354 for the stub 340, thereby restoring the virtual volume to a complete file 330.

Referring to FIG. 4, the contents of the DASD cache 230 of the library manager 110 are depicted. The DASD cache 230 contains a volume database 400 that the library manager 110 uses to store information about the constructs associated with each of the virtual and physical volumes it manages. The volume database 230 contains a plurality of VOLSERs 350, which are preferably the same as those of DASD cache 210 of the VTS 104. Additionally, the volume database 230 contains a plurality of constructs 420, 422, 424, 426 pertaining to each VOLSER 350, or each virtual volume. Furthermore, the volume database 230 may contain additional information 430 about each of the VOLSERs 350 (not described). The DASD cache 230 also contains a construct database 440 which contains the volume management actions associated with each of the constructs 420, 422, 424 and 426.

The constructs 420, 422, 424, 426 in the depicted embodiment include a data class 420, a storage class 422, a management class 424, and a storage group 426. The data class 420 relates to the manner in which the data 354 of the virtual volume is to be stored. For example, the data class 420 may include whether or not the data 354 is to be compressed, formatted in a certain way, or stored on a certain type of tape. The storage class 422 relates to the desired performance of the system 100 with the data 354. For example, the storage class 422 may include whether the data 354 is to have preference to be kept in the DASD cache 210.

The management class 424 relates to the importance of the ability of the system 100 to recover the data 354 from the cartridges 116. For example, a VOLSER 350 associated with data 354 that absolutely must be recoverable may have a management class 424 of "critical," while data that can be lost without extreme adverse consequences is labeled "non-critical." The storage group 426 relates to how data 354 is to be grouped with other data 354 on a set of physical cartridges 116 or volumes. For example, the storage group 426 may relate to the branch of the company that generated the data, i.e., "sales," "finance," or "Q.A." (quality assurance). It is understood by those skilled in the art that the example constructs 420, 422, 424 and 426 depicted in FIG. 4 are a small subset of the possible names that could be used.

In one embodiment, volume management actions, which may have been previously defined by a user through control console 120 and the construct manager 240, associated with the four constructs, data class, storage class, management class and storage group, are stored in the construct database 440 of the DASD cache 230 by construct type. For clarity, only the constructs associated with the dual copy nature of one embodiment are shown. Those constructs, management class definitions 450 and storage group definitions 460 are used in the determination of whether multiple physical copies are required for a virtual volume. For each defined management class name 452, a secondary storage pool 454 may be specified or not. For each defined storage group name 462, a primary storage pool 464 is specified. The primary storage pool 464 and, if specified, the secondary storage pool 452, indicates which group of physical volumes data 354 for a virtual volume residing in DASD cache 210 is to be stored on as the primary and secondary copy of the data, respectively.

The volume management actions for management class 424 and storage group 426 specify where the data 354 is to be stored. If dual storage is desirable, both primary and secondary storage pools are specified.

For example, the user may specify that all data 354 with a management class 424 of "critical" must be stored on multiple cartridges 116, while data 354 with a management class 424 of "non-critical" is stored on only one cartridge 116. To achieve that result, the management class 424 name for "critical" is defined to have a secondary storage pool 454 of, for example, "6" (a reference to a group of physical volumes, not further described) while the management class 424 name for "Non-Critical" does not have a secondary storage pool 454 defined. The lack of a secondary storage pool 454 value means that only a primary copy of the data will be made. As another example, assuming reliable recovery of data 354 generated by the finance department is of paramount importance, volumes for which the storage group 426 is "finance" may be redundantly stored, while volumes from a different storage group 426 are only copied to a single cartridge 116.

In addition to the above embodiment of the contents of the DASD cache 230, it is understood to those familiar with the art that the contents of the volume database 400 and the construct database 440 may be combined into a single database.

These determinations are made by the library manager 110 and VTS 104 using criteria established via the control console 120. Hence, the determination of whether multiple physical copies are required is made in a manner that is transparent to the host 106. The host 106 provides the constructs 420, 422, 424, 426 associated with each virtual volume, but the volume management actions need not be dealt with by the host 106. The manner in which volumes are stored using the volume management actions will be further described in connection with FIGS. 5 and 6.

Referring to FIG. 5, a data flow diagram illustrates one manner in which the constructs for a virtual volume are provided by the host 106 and retained in the volume database 400 in the DASD cache 230. Under this embodiment, the host 106 transmits a mount command 510 to the VTS 104. The mount command 510 includes the VOLSER 350 of the virtual volume and the constructs 420, 422, 424, 426. As mentioned previously, the constructs 420, 422, 424, 426 in one embodiment do not specify where the physical copies should reside or how many physical copies should be made.

The VTS 104 receives the mount command 510 on one of the virtual tape drives 200. As part of the processing of the mount command 510, the virtual tape drive 200 instructs the file system manager 202 to open a file in the DASD cache 210 that will be used for subsequent write and/or read commands from the host 106. Mounting of a volume on a tape drive is commonly known in the art and is not further described. The constructs 420, 422, 424, 426, however, are not stored in the VTS 104. Rather, the VTS 104 transmits a redacted mount command 520 to the library manager 110. The redacted mount command 520 contains the VOLSER 350 and the constructs 420, 422, 424, 426.

The library manager 110 receives the mount command 520 which is processed by the command processor 225. As part of processing the mount command 520, the command processor passes the VOLSER 350 and the constructs 420, 422, 424, 426 to the volume manager 235 which inserts or updates the constructs in the volume database 400 associated with the volume indicated by VOLSER 350. Optionally, one or more of the constructs 420, 422, 424 or 426 may contains all blanks, nulls or some other combination of indicators that indicate that the existing construct assignment is to be maintained. In that case a subset of the constructs are updated in the volume database 400 associated with the volume indicated by VOLSER 350.

For this example, it is assumed that the VOLSER 350 is that labeled "VOLSER 2" in FIG. 4. To establish the constructs associated with "VOLSER 2", the host 106 issued a mount command 510 that specified "VOLSER 2" in VOLSER 350, "Old Format" in data class 420, "None" in storage class 422, "Critical" in management class 424 and "Finance" in storage group 426. The constructs 420, 422, 424 and 426 remain associated with the volume indicated by VOLSER 350 until updated by another mount command 520. It is understood by those skilled in the art that a different command (not described) from host 106 or user action through control console 120 (not described) could also update the constructs associated with a volume.

Once the mount command 510 has completed processing in the VTS 104 and the library manager 110, the host 106 transmits write data commands to the VTS 104 to be processed by the virtual tape drive 200 that processed the mount command 510. The virtual tape drive 200 processes the write data commands to build data 354 to be stored in the DASD cache 210 on a virtual volume identified in the mount command 510 as VOLSER 350. The process of having the host 106 transmit write data commands continues until the host 106 has written all of the data it needs to the virtual tape volume. At that point, the host 106 transmits a control command (not described) that instructs the VTS 104 to close the virtual volume on the DASD cache 210. Once the volume is closed, the VTS 104 transmits the data 354 to the tape drive units 112. This may be done via the network 118 depicted in FIG. 1. As mentioned previously, this data transfer may not be synchronous. Furthermore, the VTS 104 may wait for additional action (or inaction) from the host 106 before transmitting the data 354 to the tape drive units 112. One example of a possible storage method according to the invention will be shown and described in connection with FIG. 6. One example of a possible retrieval method according to the invention will be shown and described in connection with FIG. 7.

Figure 6:
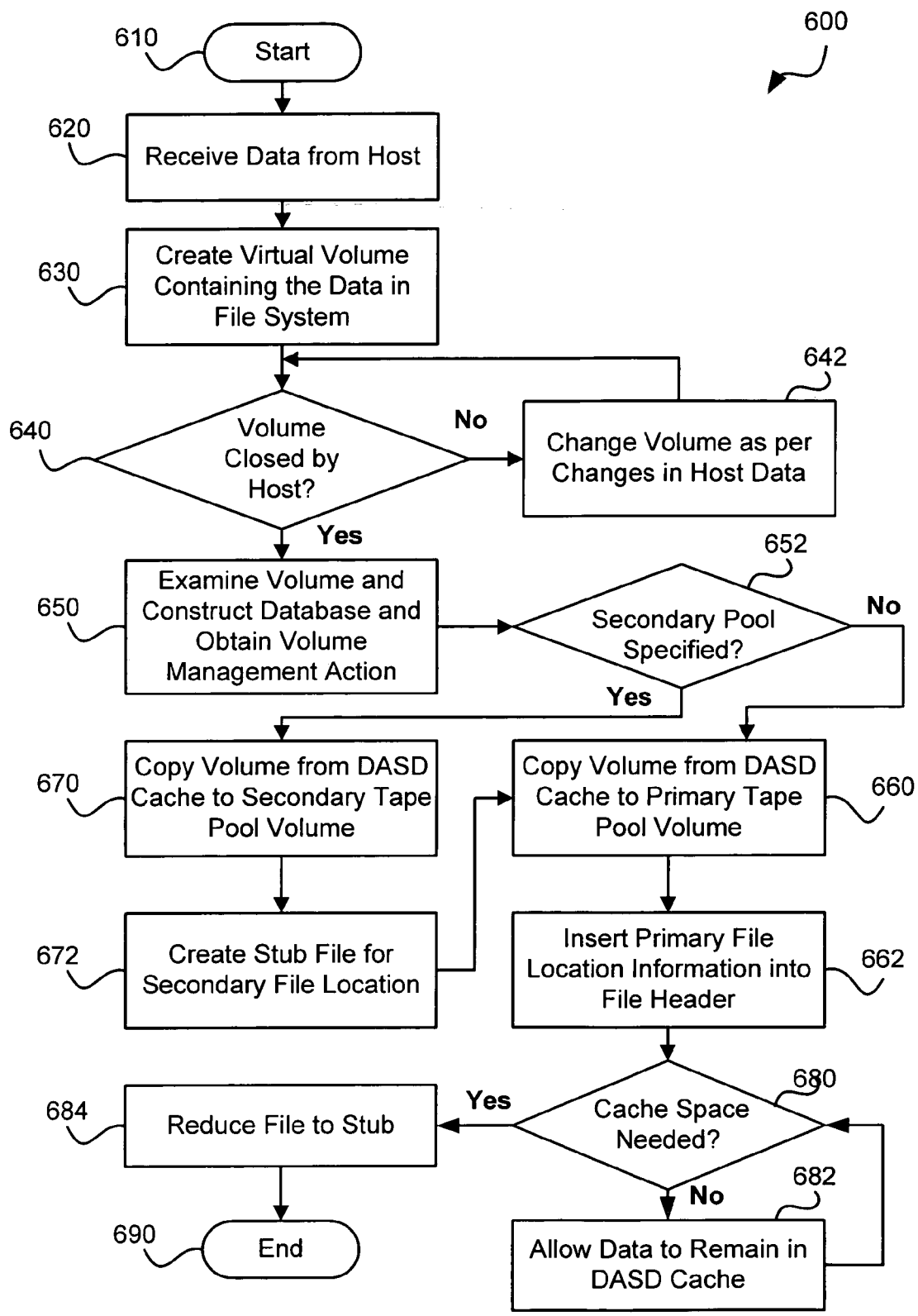
FIG. 6 is a schematic flow chart diagram illustrating one embodiment of a storage method by which a virtual volume may be copied to multiple physical volumes within the virtual tape system of FIG. 1.

Referring to FIG. 6, a schematic flowchart diagram depicts one embodiment of a storage method 600 that may be employed by the system 100 according to the present invention. The method 600 starts 610 and receives 620 a volume of data 354 from the host 106. As mentioned previously, the data 354 may be transmitted from the host 106 to the VTS 104 in one or more write data commands. A virtual volume is then created 630 in the VTS 104 to contain the data 354 prior to creation of a physical copy. As discussed above, the virtual volume may be a file 330 stored within the DASD cache 210.

The VTS 104 determines 640 whether the volume has been closed by the host 106. While the volume is still open, changes may still be made to the volume by the host 106. Consequently, it is desirable to allow the host 106 to close the volume prior to commencing the more time consuming process of making physical copies. If the volume has not been closed by the host 106, the volume is changed 642 in the DASD cache 210 to reflect changes made by the volume within the host 106.

When the volume has been closed by the host 106, the volume database 400 and the construct database 440 is examined 650, for example, by the construct manager 240 of the library manager 110, to determine the appropriate volume management actions for the volume. In one embodiment, the host 106 transmits a rewind/unload command to the VTS 104 for the virtual tape drive 200 on which the volume was mounted. In processing the rewind/unload command, the virtual tape drive 200 instructs the file system manager 202 to close the file associated with the volume. The hierarchical storage manager 204 is notified by the file system manager 202 that the volume has been closed. The hierarchical storage manager 204 then requests, through the automated storage manager administrator 208, the volume management actions for the volume. The request is transmitted to the library manager 104, processed by the command processor 225 which passes the request to the construct manager 240. The construct manager 240 then accesses the information for the volume in the volume database 400. The construct manager 240 then uses the constructs 420, 422, 424 and 426 obtained to access the construct database 440 to obtain the volume management actions for the constructs. The resulting volume management actions are then returned to the hierarchical storage manager 204 through the command processor 225 and the automated storage manager administrator 208. Other methods for obtaining the volume management actions can be envisioned, for example, combining the volume database 400 and the construct database 440 into one database and/or having the hierarchical storage manager 208 directly access the DASD cache 230 to obtain the needed information. As previously described, the VTS 104 may wait to perform the copy process described below. If no secondary storage pool is specified for the volume management action for the construct management class 424, the volume, i.e., the data 354, from file 330, is copied 660 from the DASD cache 210 to a physical volume in the primary tape pool, which is the single location specified by the volume management action for the construct storage group 426.

The primary file location information is then inserted 662 into the header of the corresponding file 330 for the volume in the DASD cache 210. According to one example, this is accomplished by inserting the object identity 352 which corresponds to the location 360 of the primary physical copy in the HSM database 320 into the file 330 within the DASD cache 210.

If the volume management action for the volume does specify a secondary physical storage pool, the volume, or the data 354, from file 330, is copied 670 from the DASD cache 210 to a physical volume in the specified secondary tape pool. Since the secondary copy was created from the same file 330 that will denote the primary copy, a stub 340 is then created 672 for the secondary copy. The stub 340 contains the secondary file location, or an object identity 352 that corresponds to the location 360 of the secondary physical copy in the HSM database 320.

After the stub 340 has been created 672 for the secondary physical copy, the volume is copied 660 from the DASD cache 210 and the location of the primary physical copy is inserted 662 into the file 330, as described previously. Thus, a primary physical copy and a secondary physical copy of the virtual volume have been created on two different cartridges 116.

As part of the process of copying the file 330 for the volume from the DASD cache 210 to the primary tape pool, and for a dual copy, the secondary tape pool, one or two physical tape volumes are selected and mounted on one or two tape drive units 112 and readied to receive the data 354. In one embodiment, the hierarchical storage manager 204 determines when and which physical volume(s) are to be mounted on which tape drive units 112 and transmits instructions to the library manager 110 to perform the actions necessary. Alternatively, if a physical volume is already mounted on a tape drive unit 112 that meets the criteria for use by the hierarchical storage manager 204, the step of instructing the library manager 110 to perform the mount operation is not needed.

After creation of the physical copy or copies, the cache management algorithm determines 680 whether the space taken by the file 330 storing the data 354 is needed for another purpose by the DASD cache 210. If the space is not needed, the data 354 is allowed 682 to remain in the DASD cache 210 until the space is needed. Once the space is needed, the data 354 is reduced 684 in the file 330 to a portion of the data 356, thereby leaving a stub 340. As mentioned previously, a small portion of the data 354 may remain with the stub 340.

If a single physical copy was made, a single stub 340 for the volume exists in the DASD cache 210. If two physical copies were made, two stubs 340 exist in the DASD cache 210 for the same volume of data 354; one stub 340 is present for each physical copy. The method 600 ends 690.

Figure 7:
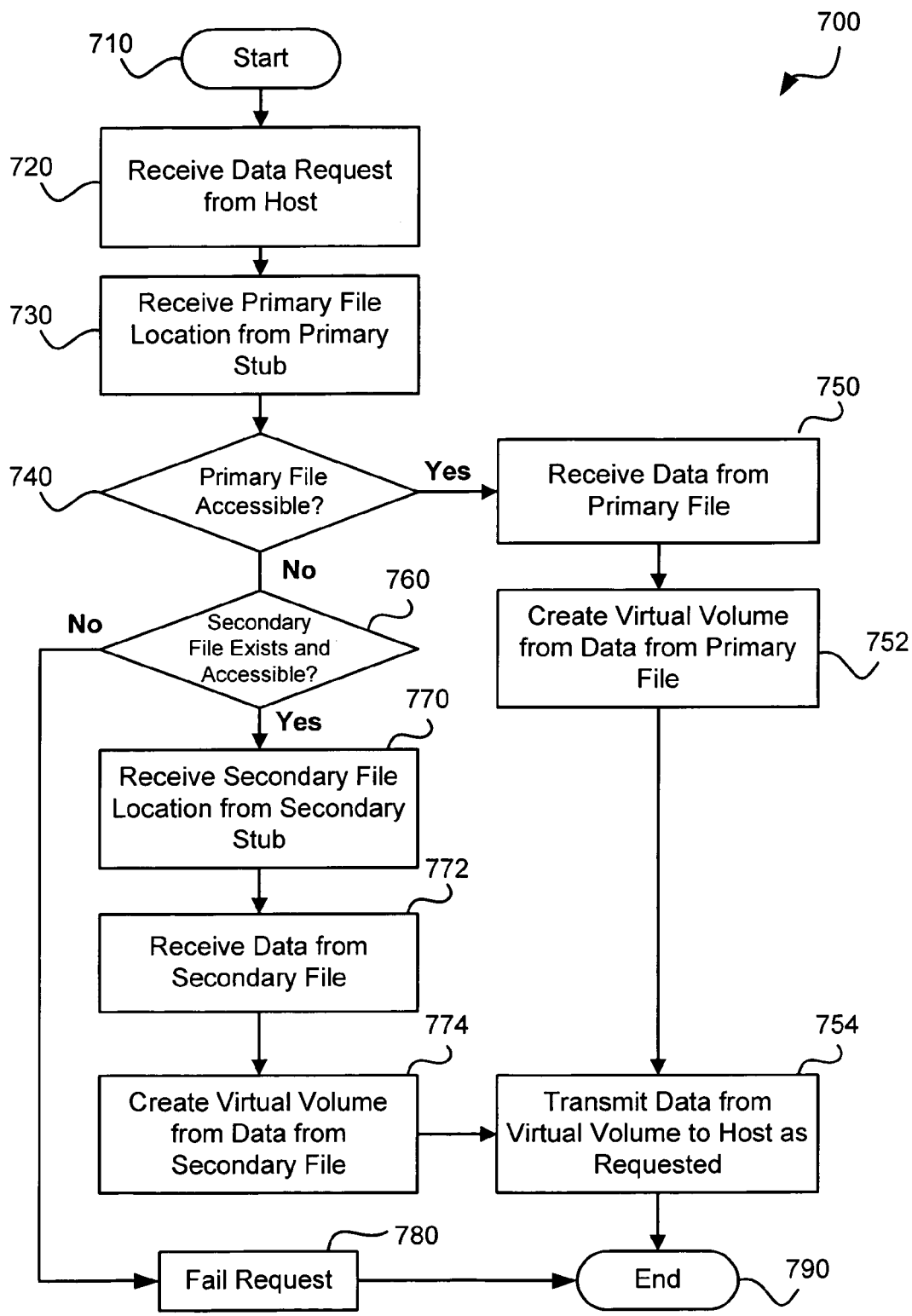
FIG. 7 is a schematic flow chart diagram illustrating one embodiment of a retrieval method by which data on a physical volume may be retrieved from the primary or secondary storage pools to create a virtual volume within the virtual tape system of FIG. 1.

Referring to FIG. 7, a schematic flowchart diagram depicts one embodiment of a retrieval method 700 that may be employed by the system 100 according to the invention. The method 700 starts 710 and receives 720 a data request in the VTS 104 from the host 106. The data request may include the VOLSER 350 corresponding to the data 354 requested by the host 106. In one embodiment, the request from the host 106 is in the form of a mount command 510, described previously. The VTS 104 searches the DASD cache 210 for the VOLSER 350 of the requested data 354. If the VOLSER 350 is found in a file 330, the data 354 requested by the host 106 is already present in a virtual volume and is simply relayed from the VTS 104 to the host 106.

However, if the VOLSER 350 is found in a stub 340, the virtual volume no longer exists, and the data 354 must be retrieved from the cartridges 116. Thus, the VTS 104 receives 730 the primary file location from the stub 340 corresponding to the primary physical copy. This may be accomplished by finding the object identity 352 that corresponds to the VOLSER 350 within the stub 340 and finding the location 360 that is associated with the object identity 352 within the HSM database 320.

The VTS 104 then attempts to access the primary physical copy. The VTS 104 determines 740 whether the primary physical copy is accessible. If the primary physical copy is accessible, the VTS 104 receives 750 the data 354 from the primary physical copy, for example, via the network 118. The VTS 104 then creates 752 a virtual volume containing the data 354 from the primary physical copy. This may be accomplished by adding the data 354 to the stub 340 corresponding to the primary physical copy to create a file 330 containing the data 354. The data 354 is then transmitted 754 to the host 106, as requested.

If the primary physical copy is not accessible, the VTS 104 determines 760 whether a secondary copy of the virtual volume exists. According to one example, a secondary physical copy may be denoted by a VOLSER 350 that is the same as the VOLSER 350 of the primary copy, except for the addition of an indicator that indicates a secondary physical copy of the VOLSER 350. For example, a primary physical copy may have a VOLSER of "V12345," while the corresponding secondary physical copy has a VOLSER of "V12345a." Thus, determining 760 whether a secondary physical copy is present may simply be searching for the VOLSER 350 of the primary physical copy and the indicator that denotes a secondary copy.

If the secondary physical copy exists and is also accessible 760, the VTS 104 receives 770 the secondary file location from the stub 340 corresponding to the secondary physical copy. As with the primary file location, this may be accomplished by finding the object identity 352 that corresponds to the VOLSER 350 of the secondary physical copy within the stub 340 and finding the location 360 that is associated with the object identity 352 within the HSM database 320.

The VTS 104 then receives 772 the data 354 from the secondary physical copy. The VTS 104 is able to create 774 the virtual volume within the DASD cache 210 by using the data 354 from the secondary physical copy. As with retrieval from the primary physical copy, this maybe achieved by adding the data 354 to the stub 340 corresponding to the secondary physical copy to create a file 330 containing the data 354. The data 354 is then transmitted 754 to the host 106, as requested.

If desired, a message may also be transmitted to the host 106 to indicate that the primary physical copy is unavailable, so that proper corrective maintenance can be undertaken. For example, such corrective maintenance may entail repair of the tape drive unit 112a, 112b, or 112c that accesses the primary physical copy, or replacement of the cartridge 116 containing the primary physical copy. If desired, such replacement may be automatically undertaken by the system 100 by transferring the data 354 of the virtual volume, as obtained from the secondary physical copy, to a new cartridge 116 and storing the new location information in the stub 340 for the primary physical location.

If no secondary physical copy exists or is not accessible, the data request from the host 106 is failed 780 by the VTS 104. This may be done by sending a corresponding message to the host 106 to indicate that the requested volume is unavailable. Corrective maintenance may again be undertaken, if desired, to attempt to restore the requested volume.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A virtual tape system configured to store data from a host on a plurality of physical volumes, the virtual tape system comprising:
   means for receiving a volume of data from the host;
   means for storing the volume of data on a virtual tape server;
   means for receiving a user instruction directing creation of two physical copies of the volume data in response to the construct;
   means for receiving at least one construct corresponding to the volume of data from the host;
   means for processing the construct in a manner that is substantially transparent to the host to make a determination of whether the volume of data is to be copied to two physical volumes; and
   means for selectively initiating creation of two physical copies of the volume of data on the physical volumes according to the determination, wherein neither of the two physical copies shares a physical volume.

2. The virtual tape system of claim 1, wherein the means for storing the volume of data on a virtual tape server is configured to store the volume of data as a first file comprising a first stub portion and a first data portion and to retain the first stub portion after creation of the two physical copies and deletion of at least a subset of the first data portion.

3. The virtual tape system of claim 2, wherein the two physical copies comprise a
   primary copy and a secondary copy, the first stub portion corresponding to the primary copy, the virtual tape system further comprising a means for storing a second stub portion corresponding to the secondary copy on the virtual tape server.

4. The virtual tape system of claim 1, wherein the means for processing the construct is configured to find a volume management action that corresponds to the construct in a construct database maintained in a library manager independent of the host, the construct database comprising a plurality of constructs and a plurality of volume management actions associated with the constructs.

5. A virtual tape system configured to store data from a host on a plurality of physical volumes, the virtual tape system comprising:
   one or more tape drive units, each of which is configured to write to at least one of the physical volumes;
   a virtual tape server configured to receive a volume of data and at least one construct corresponding to the volume of data from the host; and
   a library manager configured to process the construct in a manner that is substantially transparent to the host to selectively initiate creation of two physical copies of the volume of data on the physical volumes, wherein neither of the two physical copies shares a common physical volume.

6. The virtual tape system of claim 5, wherein the virtual tape server is further configured to store the volume of data as a first file comprising a first stub portion and a first data portion and to retain the first stub portion after creation of the two physical copies and deletion of at least a subset of the first data portion.

7. The virtual tape system of claim 6, wherein the two physical copies comprise a primary copy and a secondary copy, the first stub portion corresponding to the primary copy, wherein the virtual tape server is further configured to store a second stub portion corresponding to the secondary copy.

8. The virtual tape system of claim 5, wherein the library manager comprises a volume database configured to store a plurality of constructs including the construct received from the host, and a plurality of volume management actions associated with the plurality of constructs.

9. The virtual tape system of claim 8, wherein the construct comprises a management class that specifies a relative importance of recoverability of the volume of data from the tape drive units.

10. The virtual tape system of claim 8, wherein the construct comprises a management class that specifies a secondary pool designator.

11. The virtual tape system of claim 5, wherein the virtual tape server comprises a hierarchical storage manager database containing a plurality of object identities, each of the object identities associated with a volume of data stored on the tape drive units, the hierarchical storage manager database further containing an object location associated with each of the object identities to specify a location of each of the object identities on the tape drive units.

12. A virtual tape server for a virtual tape system configured to store data from a host on a plurality of physical volumes, the virtual tape server comprising:
   a processor;
   a virtual tape drive configured to receive and store a volume of data from the host; and
   a memory configured to store computer code comprising:
   a file system manager configured to receive a construct corresponding to the volume of data from the host; and
   a hierarchical storage manager configured to transmit the volume of data to one or more physical volumes to create two physical copies of the volume of data in response to a determination of a library manager that two physical copies of the volume of data are to be created in response to a user instruction directing creation of two physical copies of the volume data for the construct, wherein the determination is made by processing the construct in a manner that is substantially transparent to the host and neither of the two physical copies shares a common physical volume.

13. The virtual tape server of claim 12, wherein the virtual tape drive is further configured to store the volume of data as a first file comprising a first stub portion and a first data portion and to retain the first stub portion after creation of the two physical copies and deletion of at least a subset of the first data portion.

14. The virtual tape server of claim 13, wherein the two physical copies comprise a primary copy and a secondary copy, the first stub portion corresponding to the primary copy, the virtual tape drive further configured to store a second stub portion corresponding to the secondary copy.

15. The virtual tape system of claim 12, further comprising an automated storage manager administrator configured to transmit the construct to the library manager and to receive a command to initiate creation of two physical copies of the volume of data from the library manager.

16. A library manager for a virtual tape system configured to store data from a host on a plurality of physical volumes, the library manager comprising:
   a processor; and
   a memory configured to store computer code comprising:
   a construct database comprising a plurality of constructs and volume management actions, each of which is associated with at least one of the constructs; and
   a construct manager configured to read the construct database to determine which of the volume management actions is associated with one of the constructs that corresponds to a volume of data within a virtual tape server of the virtual tape system,
   a command processor configured to direct the virtual tape system to initiate creation of two physical copies of the volume of data from the virtual tape server in response to a determination that the volume management action associated with the construct corresponding to the volume of data specifies that two physical copies should be created, wherein neither of the two physical copies shares a physical volume.

17. The library manager of claim 16, the construct manager further configured to modify associations of volume management actions and constructs in response to user input independent of the host.

18. The library manager of claim 17, wherein the construct manager is configured to receive the user input via a control console that is only directly coupled to the library manger.

19. The library manager of claim 16, wherein the construct that corresponds to a volume of data within the virtual tape server comprises a management class that specifies a relative importance of recoverability of the volume of data.

20. The library manager of claim 16, wherein the construct that corresponds to a volume of data within the virtual tape server comprises a secondary pool designator.

21. A method for storing data from a host on a plurality of physical volumes of a virtual tape system, the method comprising:
   receiving a volume of data from the host;
   storing the volume of data on a virtual tape server;
   receiving at least one construct corresponding to the volume of data from the host;
   receiving a user instruction directing creation of two physical copies of the volume data in response to the construct;
   processing the construct in a manner that is substantially transparent to the host to make a determination of whether the volume of data is to be copied to two physical volumes; and
   selectively initiating creation of two physical copies of the volume of data on the physical volumes according to the determination, wherein neither of the two physical copies shares a physical volume.

22. The method of claim 21, wherein the volume of data comprises a stub portion and a data portion, the method further comprising:
   deleting at least a subset of the data portion from the virtual tape server; and
   retaining the stub portion after creation of the two physical copies and deletion of at least a subset of the data portion from the virtual tape server.

23. The method of claim 22, wherein the two physical copies comprise a primary copy and a secondary copy, the first stub portion corresponding to the primary copy, the method further comprising storing a second stub portion corresponding to the secondary copy in the virtual tape server.

24. The method of claim 21, wherein processing the construct comprises finding a volume management action that corresponds to the construct in a construct database maintained in a library manager independent of the host, the construct database comprising a plurality of constructs and a plurality of volume management actions associated with the constructs.

25. A computer readable medium comprising computer code configured to carry out a method for storing data from a host on a plurality of physical volumes of a virtual tape system, the method comprising:

receiving a volume of data from the host;

storing the volume of data on a virtual tape server;

receiving at least one construct corresponding to the volume of data from the host;

receiving a user instruction associating the construct with a volume management action directing creation of two physical copies of the volume data; and closing the volume of data on the virtual tape server;

processing the construct in a manner that is substantially transparent to the host to make a determination of whether the volume of data is to be copied to two physical volumes; and selectively initiating creation of two physical copies of the volume of data on the physical volumes according to the determination, wherein neither of the two physical copies shares a physical volume.

26. The computer readable medium of claim 25, wherein the volume of data comprises a stub portion and a data portion, the method further comprising:

deleting at least a subset of the data portion from the virtual tape server; and retaining the stub portion after creation of the two physical copies and deletion of at least a subset of the data portion from the virtual tape server.

27. The computer readable medium of claim 26, wherein the two physical copies comprise a primary copy and a secondary copy, the first stub portion corresponding to the primary copy, the method further comprising storing a second stub portion corresponding to the secondary copy in the virtual tape server.

28. The computer readable medium of claim 25, wherein processing the construct comprises finding the volume management action that corresponds to the construct in a construct database maintained in a library manager independent of the host, the construct database comprising a plurality of constructs and a plurality of volume management actions associated with the constructs.

* * * * *